United States Patent
Bhagwani et al.

(10) Patent No.: US 10,531,255 B2
(45) Date of Patent: Jan. 7, 2020

(54) METHOD AND SYSTEM FOR OVER-THE-AIR PROVISIONING OF WIRELESS HART (HIGHWAY ADDRESSABLE REMOTE TRANSDUCER) DEVICES

(71) Applicant: Honeywell International Inc., Morris Plains, NJ (US)

(72) Inventors: Maneesh Bhagwani, Rajasthan (IN); Prasad Samudrala, Karnataka (IN); Sandeep Rudraraju, Telangana (IN)

(73) Assignee: Honeywell International Inc., Morris Plains, NJ (US)

( * ) Notice: Subject to any disclaimer, the term of this patent is extended or adjusted under 35 U.S.C. 154(b) by 21 days.

(21) Appl. No.: 15/981,879

(22) Filed: May 16, 2018

(65) Prior Publication Data
US 2019/0116477 A1 Apr. 18, 2019

Related U.S. Application Data

(60) Provisional application No. 62/573,386, filed on Oct. 17, 2017.

(51) Int. Cl.
*H04W 4/50* (2018.01)
*H04L 29/08* (2006.01)
(Continued)

(52) U.S. Cl.
CPC .............. *H04W 4/50* (2018.02); *H04L 67/34* (2013.01); *H04W 16/18* (2013.01); *H04W 4/38* (2018.02); *H04W 84/18* (2013.01)

(58) Field of Classification Search
CPC ......... H04W 4/50; H04W 16/18; H04W 4/38; H04W 84/18; H04L 67/34
See application file for complete search history.

(56) References Cited

U.S. PATENT DOCUMENTS 6,975,219 B2 12/2005 Eryurek et al.
8,073,991 B2 12/2011 Alley et al.
(Continued)

FOREIGN PATENT DOCUMENTS

WO WO-2018164107 A1 * 9/2018

OTHER PUBLICATIONS

WirlessHART, https://en.wikipedia.org/wiki/WirelessHART, downloaded Sep. 15, 2017.
(Continued)

*Primary Examiner* — Minjung Kim

(57) ABSTRACT

Methods, systems and devices for OTAP (Over the Air Provisioning) of WirelessHART (Highway Addressable Remote Transducer) devices. A unique system level setting can be provided for enabling over the air provisioning of WirelessHART devices in a WirelessHART network having one or more field device access points. Each field device access point can be configured to be enabled/disabled to advertise in a specific WirelessHART network ID in association with a target WirelessHART network ID with respect to the WirelessHART network. A join key is provided in association with a new WirelessHART network ID to which at least one field device access point among the plurality of field device access points needs to be advertised along with a time limit, thereby enabling provisioning of the WirelessHART devices to a target wireless network, wherein the target WirelessHART network ID and the join key are written with respect to a new WirelessHART device. The new WirelessHART device can be then restarted. The WirelessHART network can be then disabled after provisioning is complete.

16 Claims, 9 Drawing Sheets

(51) Int. Cl.
*H04W 16/18* (2009.01)
*H04W 84/18* (2009.01)
*H04W 4/38* (2018.01)

(56) References Cited

U.S. PATENT DOCUMENTS

| | | |
|---|---|---|
| 8,344,542 B2 | 1/2013 | Micallef et al. |
| 8,463,963 B2 | 6/2013 | Komiyama et al. |
| 8,570,922 B2 | 10/2013 | Pratt, Jr. et al. |
| 8,831,145 B2 | 9/2014 | Shelburne |
| 8,971,445 B2 | 3/2015 | O'Keeffe et al. |
| 9,178,967 B2 | 11/2015 | Sin |
| 9,338,224 B2 | 5/2016 | Almadi et al. |
| 9,578,398 B2 | 2/2017 | Svoen et al. |
| 9,730,078 B2 | 8/2017 | Nixon et al. |
| 9,735,570 B2 | 8/2017 | Sinreich |
| 9,778,089 B2 | 10/2017 | Edvardsson |
| 9,974,150 B2 | 5/2018 | Oliver |
| 2012/0230446 A1 | 9/2012 | Feng |
| 2014/0038591 A1 | 2/2014 | Pratt, Jr. et al. |
| 2016/0100437 A1* | 4/2016 | Armstrong ............ H04W 4/023 |
| | | 370/249 |
| 2016/0323030 A1* | 11/2016 | Fujimoto ............ H04B 7/15507 |
| 2017/0142623 A1 | 5/2017 | Lindoff et al. |
| 2017/0180214 A1 | 6/2017 | Azevedo et al. |
| 2017/0245797 A1 | 8/2017 | Quinn |
| 2017/0250737 A1 | 8/2017 | Riviere et al. |
| 2017/0261558 A1 | 9/2017 | Freer |

OTHER PUBLICATIONS

Mark Nixon, "A Comparison of WirelesssHart and ISA100.11a", Revision 1.0, Release Date: Sep. 23, 2012.
Brandon Gust, Honeywell Wireless.
WirelessHart, the first simple, reliable, and secure wireless standard for process monitoring and control.
Soroush Amidi and Amol Gandhi, "An Open, Standard-Based Wireless Network: Connecting WirelessHART® Sensor Networks to Experion™ PKS Using Honeywell's OneWireless™ Network", Honeywell Process Solutions, Feb. 2012.
Emerson Process Management, "Jun. 2011 Interactive Wireless Webinar Series", Jun. 2011.

\* cited by examiner

102

ISA100 Network Provisioning
Over the Air Provisioning: [Enabled ▼] ⟵ 103

Over the Air Provisioning
Time Remaining: 60   Minutes
[Enable for 60 Minutes] ⟵ 106
[Disable] ⟵ 108

FIG. 3

METHOD AND SYSTEM FOR OVER-THE-AIR PROVISIONING OF WIRELESS HART (HIGHWAY ADDRESSABLE REMOTE TRANSDUCER) DEVICES

CROSS-REFERENCE TO PROVISIONAL APPLICATION

This application claims priority under 35 U.S.C. 119(e) to U.S. Provisional Patent Application Ser. No. 62/573,386 entitled "Method and System for Over-the-Air Provisioning of Wireless HART (Highway Addressable Remote Transducer) Devices," which was filed on Oct. 17, 2018, the disclosure of which is incorporated herein by reference in its entirety.

TECHNICAL FIELD

Embodiments are related to the field of wireless communications and to the field of process monitoring and control in industrial and hazardous plants and environments. Embodiments further relate to plant automation networks. Embodiments are further related to WirelessHART (Highway Addressable Remote Transducer) devices and networks.

BACKGROUND

In the the process control industry, standardized communication protocols are employed to enable devices made by different manufacturers to communicate with one another in an easy to use and implement manner. One communication standard used in the process control industry is the Highway Addressable Remote Transmitter (HART) communication protocol, referred to generally as the HART protocol. Generally speaking, the HART protocol supports a combined digital and analog signal on a dedicated wire or set of wires, in which online process signals (e.g., such as control signals, sensor measurements, etc.) are provided as an analog current signal (e.g., ranging from 4 to 20 milliamps) and in which other signals, such as device data, requests for device data, configuration data, alarm and event data, etc., are provided as digital signals superimposed or multiplexed onto the same wire or set of wires as the analog signal. However, the HART protocol currently requires the use of dedicated, hardwired communication lines, resulting in significant wiring needs within a process plant.

The Wired Highway Addressable Remote Transducer (Wired HART) protocol is a backward-compatible enhancement to 4-20 mA instrumentation that allows two-way communications with smart, microprocessor-based field devices. More specifically, the Wired HART protocol is a digital industrial automation protocol that makes use of the Bell 202 Frequency-Shift Keying (FSK) standard to superimpose digital communications signals at a low level on top of the 4-20 mA signals for communications over legacy 4-20 mA analog instrumentation wiring. Communications based on the Wired HART protocol occurs between any two Wired HART-enabled devices, typically a smart field device and a control or monitoring system. Communications occurs using standard instrumentation grade wire and using standard wiring and termination practices. As the Wired HART protocol is a master/slave protocol, a smart field device (i.e., the slave) only speaks when spoken to by a master device application (i.e., the master). A number of tasks can be achieved when a master device communicates with smart field devices, including: device configuration or re-configuration, device diagnostics, device troubleshooting, reading additional measurement values, obtaining device health and status, and so on.

The Wired HART protocol provides two simultaneous communications channels: the 4-20 mA analog signal and a digital signal. The 4-20 mA signal is used for communications of the primary measured value by field smart devices using the 4-20 mA current loop. The digital signal, superimposed on the 4-20 mA analog signal, contains information from the smart field device including device status, diagnostics, additional measured or calculated values, etc.

The WirelessHART (also referred to as wireless HART) protocol is a wireless mesh network communications protocol for process automation applications, and adds wireless capabilities to the Wired HART protocol while maintaining compatibility with existing Wired HART-enabled devices, commands and tools. A WirelessHART network uses IEEE 802.15.4 compatible radios operating in the 2.4 GHz radio band. Each device in the WirelessHART mesh network can serve as a router for messages from other devices. In other words, a device does not have to communicate directly to a gateway, but just forward its message to the next closest devices. This extends the range of the WirelessHART network and provides redundant communications routes to increase reliability.

A typical WirelessHART device requires a 2-byte Network ID and a 16-byte Join key to join a WirelessHART network. This information is provided to WirelessHART devices through the wired HART interface. The majority of factory produced WirelessHART devices are configured with a manufacturer default assigned Network ID and Join key. Thus, an installer requires a proper system and tool to provide a WirelessHART device to join an existing wireless network through a 2-wire HART interface connection present on the device.

One example is a thumb adapter requiring a physical HART modem connection to a PC where AMS is running (or a HC-475 handheld device) to connect to THUM and enter a customer Network ID and Join key manually into THUM to join the customer installed wireless network. Another example is SKF WirelessHART Vibration device model CMWA 8800. This does not even have a 2-wire HART Modem interface, and therefore a user needs to execute some key pattern to allow the device to go to a known default network ID and join keys. To change these settings, a temporary gateway is required to provision this device to join a customer installed target network.

Some organizations and companies support multi-protocol wireless solutions. Thus, a customer has to buy multiple provisioning tools (e.g., SKF vibration tool where no physical connection is available with the device) for specific vendor devices, which is very costly and difficult to maintain. In addition, transmitters may be installed in hazardous locations (e.g., such as industrial plants) or where the configuration (e.g., a physical connection device enclosure should be opened for WirelessHART provisioning) is not allowed due to on site customer safety regulations.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved wireless communications for the field of process monitoring and control in, for example, industrial plants and hazardous environments.

It is another aspect of the disclosed embodiments to provide for an improved plant automation network and device communications thereof.

It is still another aspect of the disclosed embodiments to provide for improved wireless HART devices and networks.

It is yet another aspect of the disclosed embodiments to provide for methods and systems for OTAP (Over the Air Provisioning) of WirelessHART devices.

The aforementioned aspects and other objectives and advantages can now be achieved as described herein. Methods and systems are disclosed for OTAP (Over the Air Provisioning) of WirelessHART (Highway Addressable Remote Transducer) devices. In general, a unique system level setting can be provided for enabling over the air provisioning of WirelessHART devices in a WirelessHART network having a group of field device access points. Each field device access point among such field device access points can be configured to be enabled/disabled to advertise in a specific WirelessHART network ID in association with a target WirelessHART network ID with respect to the WirelessHART network. A join key can be provided in association with a new WirelessHART network ID to which on or more field device access point among the field device access points needs to be advertised along with a time limit, thereby enabling provisioning of the WirelessHART devices to a target wireless network, wherein the target WirelessHART network ID and the join key are written with respect to a new WirelessHART device. The new WirelessHART device is then restarted. The WirelessHART network can then be disabled after provisioning is complete.

Note that in one example embodiment, a method for over the air provisioning of WirelessHART (Highway Addressable Remote Transducer) devices, can be implemented. Such a method can operations, instructions or steps, such as providing a system level setting for enabling OTAP (Over the Air Provisioning) of WirelessHART devices in a WirelessHART network having a group of field device access points; configuring each of the field device access points to be enabled or disabled to advertise in a specific WirelessHART network ID in association with a target WirelessHART network ID with respect to the WirelessHART network; and providing a join key in association with a new WirelessHART network ID to which one or more field device access points among the field device access points needs to be advertised along with a time limit, thereby enabling provisioning of the WirelessHART devices to a target wireless network, wherein the target WirelessHART network ID and the join key are written with respect to a new WirelessHART device and the new WirelessHART device is then restarted.

Additional operations, instructions or steps can include, for example, disabling the WirelessHART network after the provisioning is complete. In some example embodiments, the WDM (Wireless Device Manager) writes the WirelessHART network ID and the Join key with respect to the new Wireless HART device and then restarts the new WirelessHART device. In still another example embodiment, the aforementioned WDM communicates with one or more of the field device access point. In addition, in some example embodiments, operations, instructions or steps can be provided for provisioning the new WirelessHART device through a GUI (Graphical User Interface).

In some example embodiments, the aforementioned GUI can be provided as a system/gateway level setting. In another example embodiment, the GUI can include a GUI section for WirelessHART network provisioning and enablement of the OTAP via a graphically displayed selection button; and wherein the GUI includes a graphically displayed section for the OTAP that includes an area for displaying a current WirelessHART Subnet ID.

In still another example embodiment, the aforementioned GUI can be configured to a graphically displayed interactive area for entering and displaying a new WirelessHART Subnet ID with which new WirelessHART devices are shipped from a factory and require provisioning to target a WirelessHART subnet ID and wherein the GUI additionally graphically displays the join key in association with a time remaining and a graphically display button for enabling for a particular amount of time and a graphically displayed button for disabling the OTAP.

In another example embodiment, a system for over the air provisioning of WirelessHART devices, can be implemented, which includes a storage device, wherein the storage device stores computer usable program code, and a processor. The processor is configured to execute the computer usable program code, and the computer usable program code can include instructions for: providing a system level setting for enabling OTAP (Over the Air Provisioning) of WirelessHART devices in a WirelessHART network having a group of field device access points; configuring each of the field device access points among the group of field device access points to be enabled or disabled to advertise in a specific WirelessHART network ID in association with a target WirelessHART network ID with respect to the WirelessHART network; and providing a join key in association with a new WirelessHART network ID to which one or more field device access points among the group of field device access points needs to be advertised along with a time limit, thereby enabling provisioning of the WirelessHART devices to a target wireless network, wherein the target WirelessHART network ID and the join key are written with respect to a new WirelessHART device and the new WirelessHART device is then restarted.

In yet another example embodiment, a wireless network can be implemented, which includes a WirelessHART network having a group of field device access points, wherein a system level setting is provided for enabling OTAP (Over the Air Provisioning) of WirelessHART devices in the WirelessHART network having the plurality of field device access points; wherein each of the field device access points among the group of field device access points is configured to be enabled or disabled to advertise in a specific WirelessHART network ID in association with a target WirelessHART network ID with respect to the WirelessHART network; and wherein a join key is provided in association with a new WirelessHART network ID to which one or more field device access points among the group of field device access points needs to be advertised along with a time limit, thereby enabling provisioning of the WirelessHART devices to a target wireless network, wherein the target WirelessHART network ID and the join key are written with respect to a new WirelessHART device and the new WirelessHART device is then restarted.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 2 illustrates a portion of a GUI (Graphical User Interface) including a graphically displayed selection button that a user can select to enable or disable OTAP of ISA100 devices any time from ISA100 gateway for a certain duration of time, in accordance with an example embodiment;

FIG. 3 illustrates a portion of a GUI (Graphical User Interface) including a graphically displayed selection buttons for allowing a user to enable OTAP of ISA100 for a particular duration of time and for disabling such devices, in accordance with an example embodiment;

DETAILED DESCRIPTION

Figure 1:
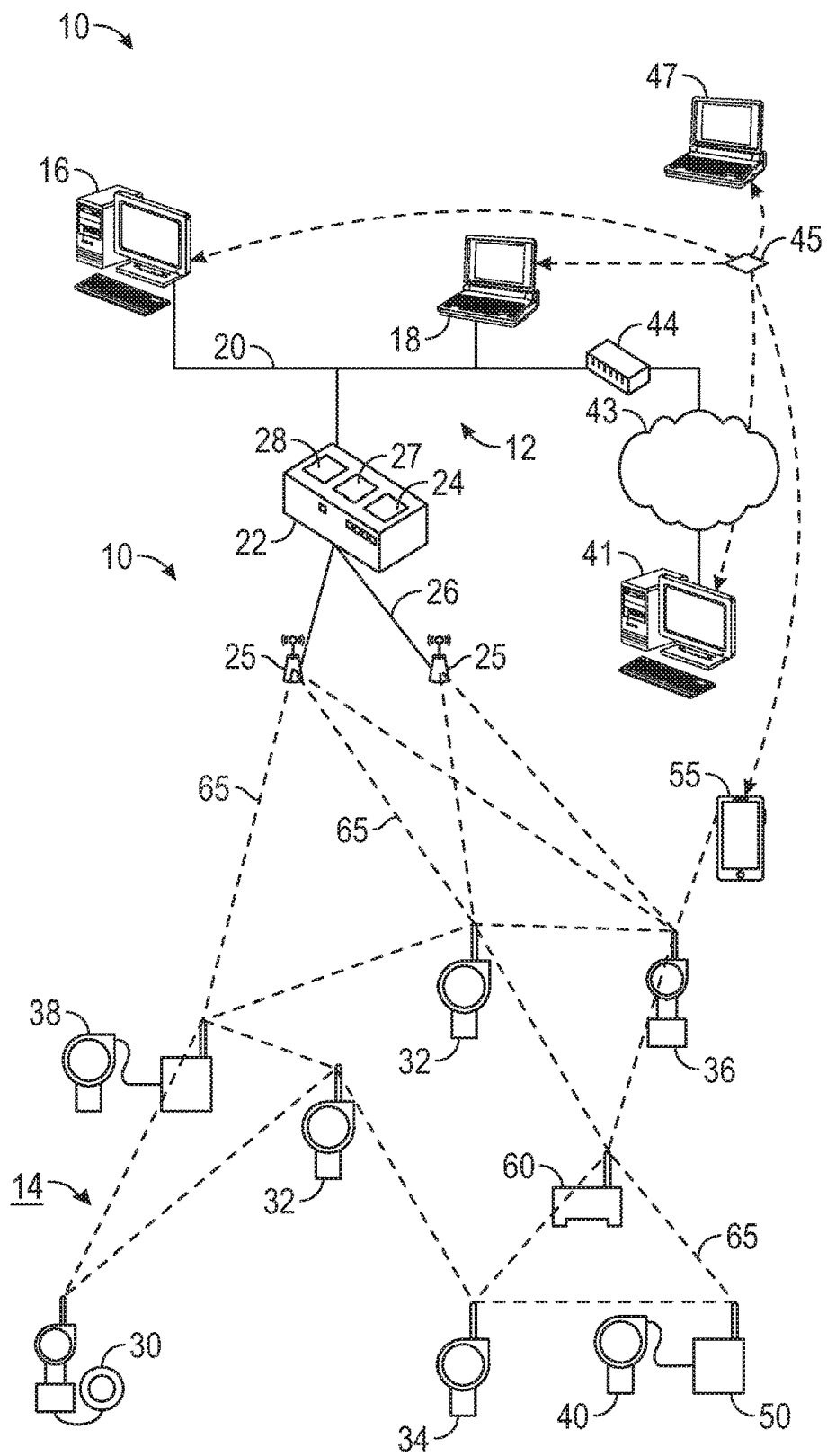
FIG. 1 illustrates a schematic diagram of an exemplary network to which a method and system may be applied for OTAP of WirelessHART devices, in accordance with an example embodiment.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. As used herein, the term "and/or" includes any and all combinations of one or more of the associated listed items.

Reference will be made in detail to the disclosed embodiments (exemplary embodiments) of the invention, examples of which are illustrated in the accompanying drawings, and which may be preferred or alternative embodiments. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

The disclosed embodiments relate to a new method and system for OTAP (Over the Air Provisioning) of WirelessHART (Highway Addressable Remote Transducer) devices. This approach provides for a unique system level setting for enabling OTAP of WirelessHART devices in a WirelessHART network having a plurality of field device access points. Each field device access point among the plurality of field device access points can be configured to be enabled/disabled to advertise in a specific WirelessHART network ID in association with a target WirelessHART network ID with respect to the WirelessHART network. A join key is provided in association with a new WirelessHART network ID to which at least one field device access point among the plurality of field device access points needs to be advertised along with a time limit, thereby enabling provisioning of the WirelessHART devices to a target wireless network, wherein the target WirelessHART network ID and the join key are written with respect to a new WirelessHART device. The new WirelessHART device is then restarted. The WirelessHART network can then be disabled after provisioning is complete.

FIG. 1 illustrates a schematic diagram of an exemplary network 10 to which a method and system may be applied for over-the-air provisioning of WirelessHART devices, in accordance with an example embodiment. The example network shown in FIG. 1 may include, for example, a plant automation network 12 and a wirelessHART network 14. The plant automation network 12 may include one or more stationary workstations 16 and one or more portable workstations 18 connected over a communication backbone 20. The backbone 20 may be implemented over, for example, Ethernet, RS-485, Profibus DP or other suitable communication protocol. Note that as utilized herein, the terms "wirelessHART" and "wireless HART" can be utilized interchangeably to refer to the same feature.

The plant automation network 12 and the wirelessHART network 14 may be connected via a gateway 22. Specifically, the gateway 22 may be connected to the backbone 20 in a wired manner and may communicate with the plant automation network 12 by using any suitable known protocol. The gateway 22 may be implemented as a standalone device, as a card insertable into an expansion slot of the hosts or workstations 16 or 18, or as part of the IO subsystem of a PLC-based or DCS-based system, or in any other manner. The gateway 22 provides applications running on the network 12 access to various devices of the wirelessHART network 14.

In addition to protocol and command conversion, the gateway 22 can be configured to provide synchronized clocking used by time slots and superframes (e.g., sets of communication time slots spaced equally in time) of the scheduling scheme of the wirelessHART network 14. In some situations, networks may be configured with more than one gateway 22. Such multiple gateways can be used to improve the effective throughput and reliability of the network by providing additional bandwidth for the communication between the wirelessHART network and the plant automation network 12 or the outside world. On the other hand, the gateway 22 device may request bandwidth from the appropriate network service according to the gateway communication needs within the wirelessHART network. The gateway 22 may further reassess the necessary bandwidth while the system is operational. For example, the gateway 22 may receive a request from a host residing outside the wirelessHART network 14 to retrieve a large amount of data. The gateway device 22 may then request additional bandwidth from a dedicated service such as a network manager in order to accommodate this transaction. The gateway 22 may then request the release of the unnecessary bandwidth upon completion of the transaction.

In some example embodiments, the gateway 22 can be functionally divided into a virtual gateway 24 and one or more network access points 25. Network access points 25 may be separate physical devices in wired communication with the gateway 22 in order to increase the bandwidth and the overall reliability of the wirelessHART network 14. However, while FIG. 1 illustrates a wired connection 26 between the physically separate gateway 22 and access points 25, it will be understood that the elements 22-26 may also be provided as an integral device. Because network access points 25 may be physically separate from the gateway device 22, the access points 25 may be strategically placed in several distinct locations. In addition to increasing the bandwidth, multiple access points 25 can increase the overall reliability of the network by compensating for a potentially poor signal quality at one access point at one or more other access points. Having multiple access points 25 also provides redundancy in case of failure at one or more of the access points 25.

The gateway device 22 may additionally contain a network manager software module 27 and a security manager software module 28. In another embodiment, the network manager 27 and/or the security manager 28 may run on one of the hosts on the plant automation network 12. For example, the network manager 27 may run on the host 16 and the security manager 28 may run on the host 18. The network manager 27 may be responsible for configuration of the network, scheduling communication between wirelessHART devices (i.e., configuring superframes), management of the routing tables and monitoring and reporting the health of the wirelessHART network 14. While redundant network managers 27 are supported, it is contemplated that there should be only one active network manager 27 per wirelessHART network 14.

Referring again to FIG. 1, the wirelessHART network 14 may include one or more field devices 30-40. In general, process control systems, like those used in chemical, petroleum or other process plants, include such field devices as valves, valve positioners, switches, sensors (e.g., temperature, pressure and flow rate sensors), pumps, fans, etc. Field devices perform control functions within the process such as opening or closing valves and taking measurements of process parameters. In the wirelessHART communication network 14, field devices 30-40 are producers and consumers of wirelessHART packets.

An external host 41 may be connected to a network 43 which, in turn, may be connected to the plant automation network 12 via a router 44. The network 43 may be, for example, the World Wide Web (WWW). Although the external host 41 does not belong to either the plant automation network 12 or the wirelessHART network 14, the external host 41 may access devices on both networks via the router 44. A network design tool 45 may reside and run on the external host 41 and provide the wireless network configuration and simulation functionality discussed in greater detail below. Alternatively, the network design tool 45 may run on the stationary workstation 16, on the portable workstation 18, or on a portable device connected directly to the wirelessHART network 14.

In some example embodiments, a network design tool 45 may run in a distributed manner on several hosts of the network 10. In yet another example embodiment, the network design tool 45 may run on a standalone host 47 and therefore have no access or only periodic access to either the network 12 or the network 14. In this case, the feedback information related to the performance of the wireless network 14 may be entered manually into the network design tool 45 by means of the host 47.

The network design tool 45 may be implemented as a software package using one or more programming languages such as C/C++ or JAVA, or for example. The software of the network design tool 45 may be stored on one or several hosts 16, 18, 41, or 47 in a conventional manner. Alternatively, the network design tool 45 may be provided on a portable memory disk such as a CD or DVD and may be loaded into the volatile memory of a computer host during operation. For example, some or all of the hosts 16, 18, 41, and 47 may include hard drives and flash drives capable of permanently storing software and CD and DVD drives compatible with a CD or DVD containing the network design tool 45. In another embodiment, the network design tool 45 may be provided as a distributed web service, or a software running remotely and accessible via the internet or intranet. For example, the remote host 41 may contain some of the software components of the network design tool 45 while the workstation 16 may provide user interface to operators via a keyboard, a mouse, a computer screen, and similar input/output devices. In accordance with this embodiment, operators may access and benefit from some or all of the features of the network design tool 45 but the software of the network design tool 45 may reside remotely for security or copyright reasons.

The wirelessHART network 14 may use a protocol which provides similar operational performance that is experienced with wired HART devices. The applications of this protocol may include process data monitoring, critical data monitoring (with the more stringent performance requirements), calibration, device status and diagnostic monitoring, field device troubleshooting, commissioning, and supervisory process control. These applications require that the wirelessHART network 14 use a protocol which can provide fast updates when necessary, move large amounts of data when required, and support network devices which join the wirelessHART network 14 only temporarily for commissioning and maintenance work.

In one example embodiment, the wireless protocol supporting network devices of the wirelessHART network 14 is an extension of HART, a widely accepted industry standard, that maintains the simple workflow and practices of the wired environment. In accordance with this embodiment, the same tools used for wired HART devices may be easily adapted to wireless devices with the simple addition of new device description files. In this manner, the wirelessHART protocol leverages the experience and knowledge gained using HART to minimize training and simplify maintenance and support.

Generally speaking, it may be convenient to adapt a protocol for wireless use so that most applications running on a device do not "notice" the transition from a wired network to a wireless network. Clearly, such transparency greatly reduces the cost of upgrading networks and, more generally, developing and supporting devices that may be used with such networks. Some of the additional benefits of a wireless extension of HART include: access to measurements that were difficult or expensive to get to with wired devices, ability to configure and operate instruments from system software that can be installed on laptops, handhelds, workstations, etc. Another benefit is the ability to send diagnostic alerts from wireless devices back through the various communication techniques to a centrally located diagnostic center. For example, every heat exchanger could be fitted with a wirelessHART device and the end user and supplier alerted when the heat exchanger detects a problem.

Yet another benefit is the ability to monitor conditions that present serious health and safety problems. For example, a wirelessHART device could be placed in flood zones on roads and used to alert authorities and drivers about water levels. Other benefits include access to wide range of diagnostics alerts and the ability to store trended as well as calculated values at the wirelessHART device so that when communications to the device are established the values can be transferred to the host. Thus, a wirelessHART protocol can provide technology for host applications to have wireless access to existing HART-enabled field devices and will support the deployment of battery operated, wireless only HART-enabled field devices.

The wirelessHART protocol may be used to establish a wireless communication standard for process applications and may further extend the application of HART communications and the benefits it provides to industry by enhancing the HART technology to support wireless process automation applications. A non-limiting example of a wirelessHART protocol is disclosed in U.S. Pat. No. 8,570,922 entitled "Efficient Addressing in Wireless HART Protocol," which is incorporated herein by reference in its entirety.

Referring again to FIG. 1, field devices 30-36 may be wirelessHART devices. In other words, a field device 30, 32, 34, or 36 may be provided as an integral unit supporting all layers of the wirelessHART protocol stack. In the network 10, the field device 30 may be a wirelessHART flow meter, the field devices 32 may be wirelessHART pressure sensors, the field device 34 may be a wirelessHART valve positioner, and the field device 36 may a wirelessHART pressure sensor. Importantly, wirelessHART devices 30-36 are HART devices supporting all that users have come to expect from the wired HART protocol. As one of ordinary skill in the art will appreciate, one of the core strengths of the HART protocol is its rigorous interoperability requirements.

In some example embodiments, all wirelessHART equipment can include core mandatory capabilities in order to allow equivalent device types to be exchanged without compromising system operation. Furthermore, the wirelessHART protocol is backward compatible to HART core technology such as the device description language (DDL). In the preferred embodiment, all HART devices should support the DDL, which ensures that end users immediately have the tools to begin utilizing the wirelessHART protocol.

On the other hand, a field device 38 may be a legacy 4-20 mA device and a field device 40 may be a wired HART device. Field devices 38 and 40 may be connected to the wirelessHART network 13 via a wirelessHART adaptor (WHA) 50. Additionally, the WHA 50 may support other communication protocols such as Foundation Fieldbus, PROFIBUS, DevicesNet, etc. In these embodiments, the WHA 50 supports protocol translation on a lower layer of the protocol stack. Additionally, it is contemplated that a single WHA 50 may also function as a multiplexer and support multiple HART or non-HART devices.

Plant personnel may additionally use handheld devices for installation, control, monitoring, and maintenance of network devices. Generally speaking, handheld devices are portable equipment that can connect directly to the wirelessHART network 14 or through the gateway 22 as a host on the plant automation network 12. As illustrated in FIG. 1, a WirelessHART-connected handheld device 55 communicates directly to the wirelessHART network 14. When operating with a formed wirelessHART network 14, this device may join the network 14 as just another wirelessHART field device. When operating with a target network device that is not connected to a wirelessHART network, the handheld device 55 may operate as a combination of the gateway device 22 and the network manager 27 by forming its own wirelessHART network with the target network device. Note that the WirelessHART-connected handheld device 55 may be a mobile device such as, for example, a smartphone, tablet computing device, etc.

A plant automation network-connected handheld device (not shown) connects to the plant automation network 12 through networking technology, such as Wi-Fi. This device talks to the network devices 30-40 through the gateway device 22 in the same fashion as external plant automation servers (not shown) or the workstations 16 and 18.

Additionally, the wirelessHART network 14 may include a router device 60. The router device 60 is a network device that forwards packets from one network device to another. A network device that is acting as a router device uses internal routing tables to decide to which network device it should forward a particular packet. Stand alone routers such as the router 60 may not be required in those embodiments where all devices on the wirelessHART network 14 support routing. However, it may be beneficial (e.g. to extend the network, or to save the power of a field device in the network) to add a dedicated router 60 to the network.

All devices directly connected to the wirelessHART network 14 may be referred to as network devices. In particular, the wirelessHART field devices 30-36, the adaptors 50, the routers 60, the gateway 22, the access points 25, and the WirelessHART-connected handheld device 55 are, for the purposes of routing and scheduling, the network devices or the nodes of the wirelessHART network 14. In order to provide a very robust and an easily expandable network, it is contemplated that all network devices may support routing and each network device may be globally identified by its HART address. The network manager 27 may contain a complete list of network devices and assign each device a short, network unique 16-bit nickname. Additionally, each network device may store information related to update rates, connections sessions, and device resources. In short, each network device maintains up-to-date information related to routing and scheduling. The network manager 27 communicates this information to network devices whenever new devices join the network or whenever the network manager detects or originates a change in topology or scheduling of the wirelessHART network 14.

Further, each network device may store and maintain a list of neighbor devices that the network device has identified during the listening operations. Generally speaking, a neighbor of a network device is another network device of any type potentially capable of establishing a connection with the network device in accordance with the standards imposed by a corresponding network. In case of the wirelessHART network 14, the connection is a wireless connection. However, it will be appreciated that a neighboring device may also be a network device connected to the particular device in a wired manner. As will be discussed later, network devices promote their discovery by other network devices through advertisement, or special messages sent out during the designated timeslots. Network devices operatively connected to the wirelessHART network 14 have one or more neighbors which they may choose according to the strength of the advertising signal or to some other principle.

Referring again to FIG. 1, in a pair of network devices connected by a direct wireless connection 65, each device recognizes the other as a neighbor. Thus, network devices of the wirelessHART network 14 may form a large number of connections 65. The possibility and desirability of establishing a direct wireless connection 65 between two network devices is determined by several factors such as the physical distance between the nodes, obstacles between the nodes, signal strength at each of the two nodes, etc. Further, two or more direct wireless connections 65 may form paths between nodes that cannot form a direct wireless connection 65. For example, the direct wireless connection 65 between the wirelessHART hand-held device 55 and wirelessHART device 36 along with the second direct wireless connection 65 between the wirelessHART device 36 the router 60 form a communication path between devices 55 and 60.

Each wireless connection 65 is characterized by a large set of parameters related to the frequency of transmission, the method of access to the radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (2.4 GHz). While the system and method discussed herein may be applied to a wireless network operating on any designated frequency or range of frequencies, the embodiment discussed below relates to the wirelessHART network 14 operating in the unlicensed, or shared part of the radio spectrum. In accordance with this embodiment, the wirelessHART network 14 may be easily activated and adjusted to operate in a particular unlicensed frequency range as needed.

For a wireless network protocol using an unlicensed frequency band, coexistence is a core requirement because a wide variety of communication equipment and interference sources may be present. Thus, in order to successfully communicate, devices using a wireless protocol must coexist with other equipment utilizing this band. Coexistence generally defines the ability of one system to perform a task in a given shared environment in which other systems have an ability to perform their tasks, wherein the various systems may or may not be using the same set of rules. One requirement of coexistence in a wireless environment is the ability of the protocol to maintain communication while there is interference present in the environment. Another requirement is that the protocol should cause as little interference and disruption as possible with respect to other communication systems.

In other words, the problem of coexistence of a wireless system with the surrounding wireless environment has two general aspects. The first aspect of coexistence is the manner in which the system affects other systems. For example, an operator or developer of the system may ask what impact the transmitted signal of one transmitter has on other radio systems operating in proximity to the system. More specifically, the operator may ask whether the transmitter disrupts communication of some other wireless device every time the transmitter turns on or whether the transmitter spends excessive time on the air effectively "hogging" the bandwidth.

One familiar with wireless communications will agree that ideally, each transmitter should be a "silent neighbor" that no other transmitter notices. While these ideal characteristics are rarely, if ever, attainable, a wireless system that creates a coexistence environment in which other wireless communication systems may operate reasonably well may be called a "good neighbor." The second aspect of coexistence of a wireless system is the ability of the system to operate reasonably well while other systems or wireless signal sources are present. In particular, the robustness of the system may depend on how well the system prevents interference at the receivers, on whether the receivers easily overload due to proximate sources of RF energy, on how well the receivers tolerate an occasional bit loss, and similar factors. In some industries, including the process control industry, there is a number of important potential applications of a wireless communication system. In these applications, loss of data is frequently not allowable. A wireless system capable of providing reliable communications in a noisy or dynamic radio environment may be called a "tolerant neighbor."

Coexistence relies (in part) on effectively employing three aspects of freedom: time, frequency and distance. Communication can be successful when it occurs at a 1) time when the interference source (or other communication system) is quiet; 2) different frequency than the interference; or 3) location sufficiently removed from the interference source. While a single one of these factors could be used to provide a communication scheme in the shared part of the radio spectrum, taking into account a combination of two or all three of these factors can provide a high degree of reliability, security and speed.

In one example embodiment, the protocol supporting the wirelessHART network 14 is a wirelessHART protocol. More specifically, each of the direct wireless connections may transfer data according to the physical and logical requirements of the wirelessHART protocol. Note that the wirelessHART protocol may be a secure, wireless mesh networking technology operating in the 2.4 GHz ISM radio band. Note that as utilized herein the term "wirelessHART protocol" refers generally to a wireless sensor networking technology based on the Highway Addressable Remote Transducer Protocol (HART).

In one example embodiment, a wirelessHART protocol may utilize IEEE 802.15.4b compatible direct sequence spread spectrum (DSSS) radios with channel hopping on a transaction by transaction basis. This wirelessHART communication may be arbitrated using time division multiple access or Time Division Multiple Access (TDMA) to schedule link activity. All communications are preferably performed within a designated time slot. One or more source and one or more destination devices may be scheduled to communicate in a given slot, and each slot may be dedicated to communication from a single source device or to a CSMA/CA-like shared communication access mode between multiple source devices. Source devices may send messages to specific target device or broadcast messages to all of the destination devices assigned to the slot.

To enhance reliability, the wirelessHART protocol may combine TDMA with a method of associating multiple radio frequencies with a single communication resource, or channel hopping. Channel hopping provides frequency diversity which minimizes interference and reduces multi-path fading effects. In particular, the data link may create an association between a single superframe and multiple carrier frequencies which the data link cycles through in a controlled predefined manner. For example, the available frequency band of a particular instance of the wirelessHART network 14 may have carrier frequencies $F_1, F_2, \ldots F_n$. A relative frame R of a superframe S may be scheduled to occur at a frequency $F_1$ in the cycle $C_n$, at a frequency $F_5$ in the following cycle $C_{n+1}$, at a frequency F.sub.2 in the cycle C.sub.n+2, and so on. The network manager 27 may configure the relevant network devices with this information so that the network devices communicating in the superframe S may adjust the frequency of transmission or reception according to the current cycle of the superframe S.

The data link of the wirelessHART protocol may offer an additional feature of channel blacklisting, or restricting the use of certain channels in the radio band by the network devices. The network manager 27 may blacklist a radio channel in response to detecting excessive interference or other problems on the channel. Further, operators or network administrators may blacklist channels in order to protect a wireless service that uses a fixed portion of the radio band that would otherwise be shared with the wirelessHART network 14. In some embodiments, the wirelessHART protocol 70 controls blacklisting on a superframe basis so that each superframe has a separate blacklist of prohibited channels.

In one embodiment, the network manager 27 is responsible for allocating, assigning, and adjusting time slot resources associated with the data link layer 76. If a single instance of the network manager 27 supports multiple wirelessHART networks 14, the network manager 27 may create an overall schedule for each instance of the wirelessHART network 14. The schedule may be organized into superframes containing time slots numbered relative to the start of the superframe. Additionally, the network manager 27 may maintain a global absolute slot count which may reflect the total of number of time slots scheduled since the start-up of the wirelessHART network 14. This absolute slot count may be used for synchronization purposes.

The wirelessHART protocol may further define links or link objects in order to logically unite scheduling and routing. In particular, a link may be associated with a specific network device, a specific superframe, a relative slot number, one or more link options (transmit, receive, shared), and a link type (normal, advertising, discovery). Not that data links may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

Both the existing HART protocol and the wirelessHART protocol are loosely organized around the ISO/OSI 7-layer model for communications protocols. In the wireless expansion of HART technology, three physical layers and two data-link layers may be supported: the wired and the wireless mesh. Because the wirelessHART protocol described herein allows deployment of mesh topologies, a significant network layer may be specified as well.

As indicated above, a superframe may be understood as a collection of time slots repeating in time. The number of slots in a given superframe (superframe size) determines how often each slot repeats, thus setting a communication schedule for network devices that use the slots. Each superframe may be associated with a certain graph identifier. In some embodiments, the wirelessHART network 14 may contain several concurrent superframes of different sizes. Moreover, a superframe may include multiple radio channels, or radio frequencies.

Further, a transport layer of the wirelessHART protocol can allow for efficient, best-effort communication and reliable, end-end acknowledged communications. As one skilled in the art will recognize, best-effort communications allow devices to send data packets without an end-to-end acknowledgement and no guarantee of data ordering at the destination device. User Datagram Protocol (UDP) is one example of this communication strategy. In the process control industry, this method may be useful for publishing process data. In particular, because devices propagate process data periodically, end-to-end acknowledgements and retries have limited utility, especially considering that new data is generated on a regular basis.

In contrast, reliable communications allow devices to send acknowledgement packets. In addition to guaranteeing data delivery, a transport layer may order packets sent between network devices. This approach may be preferable for a request/response traffic or when transmitting event notifications. When the reliable mode of the transport layer is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use reliable broadcast to tell each network device in the wirelessHART network 14 to activate a new superframe. Alternatively, a field device such as the sensor 30 may generate a packet and propagate the request to another field device such as the portable HART communicator 55. As another example, an alarm or event generated by the 34 field device may be transmitted as a request directed to the gateway 22. In response to successfully receiving this request, the gateway 22 may generate a response packet and send it to the device 34 acknowledging receipt of the alarm notification.

FIG. 2 illustrates a portion 102 of a GUI (Graphical User Interface) including a graphically displayed selection button 103 that a user can select to enable or disable OTAP of ISA100 devices any time from ISA100 gateway for a certain duration of time, in accordance with an example embodiment. In general, ISA100 devices can be provisioned over the air. ISA100 devices come with a default network ID and a default key out of the factory as per the ISA100 standard. Every ISA100 wireless gateway and FDAP (Field Device Access Point) can support a subnet ID 1 by default as defined in the standard. Thus, a user can enable/disable OTAP of ISA100 devices any time from an ISA100 gateway for a duration of time.

FIG. 3 illustrates a portion 104 of a GUI (Graphical User Interface) including a graphically displayed selection buttons 106 and 108 for allowing a user to enable OTAP of ISA100 Access Point or a Router for a particular duration of time and for disabling such devices, in accordance with an example embodiment. That is, button 106 when selected by a user allows for enabling OTAP on an Access Point or a Router for a particular amount of time, in this example, 60 minutes. Button 108 when selected by a user allows for disabling of OTAP. The GUI 104 is independent for each FDAP or Router, enabling and disabling of OTAP for each FDAP or Router is executed by user based on the placement of new devices installed in the plant. The FDAP or a Router closer to the newly placed devices is enabled for OTAP. Enabling OTAP allows factory/new ISA100 devices to join a gateway through the OTAP enabled Access Point or Router using a network ID 1, and then those ISA100 devices are provisioned to the network where at least one wireless gateway is operating.

Figure 4:
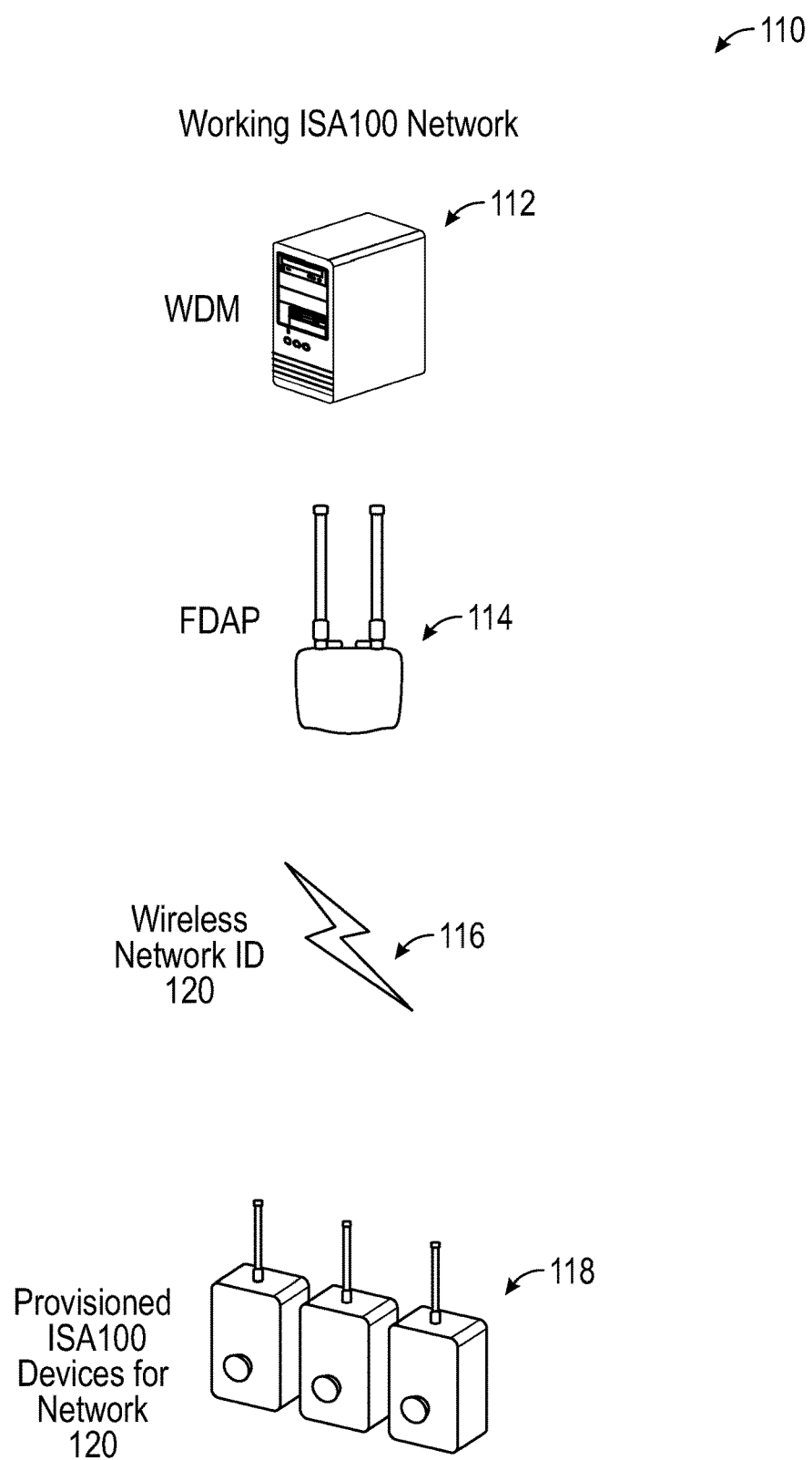
FIG. 4 illustrates a schematic diagram of a system for OTAP with respect to a working ISA100 network, in accordance with an example embodiment.

FIG. 4 illustrates a schematic diagram of a system 110 for OTAP with respect to a working ISA100 network, in accordance with an example embodiment. The system 110 includes a WDM (Wireless Device Manager) 112 that communicates with one or more FDAP's such as the FDAP 114, which in turn communicates via wireless communications 116 per a wireless network ID 120, with a group of provisioned ISA 100 devices 118 for the network 120.

Figure 5:
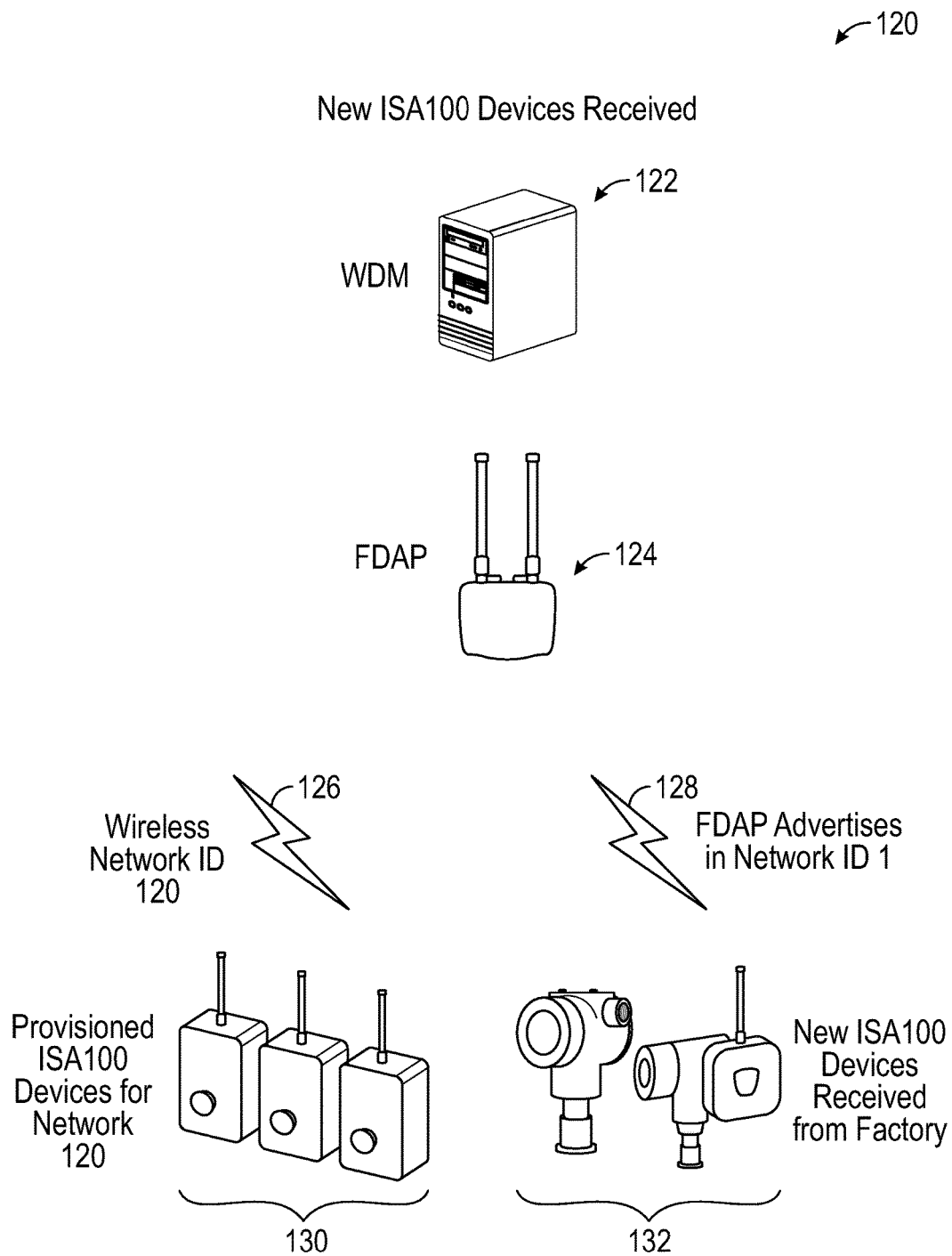
FIG. 5 illustrates a schematic diagram of a system for OTAP with respect to a working ISA100 network with new ISA100 devices, in accordance with an example embodiment.

FIG. 5 illustrates a schematic diagram of a system 120 for OTAP with respect to a working ISA100 network with new ISA100 devices received from the factory, in accordance with an example embodiment. System 120 includes a WDM 122 that enables ISA 100 OTAP and which communicates with one or more FDAP's such as the FDAP 124. The FDAP 124 in turn communicates via wireless communications 126 (i.e., wireless network ID 12) with devices 130 and/or communicates via wireless communications 128 (i.e., FDAP advertises in Network ID 1) with new ISA100 devices 132 received from the factory.

Figure 6:
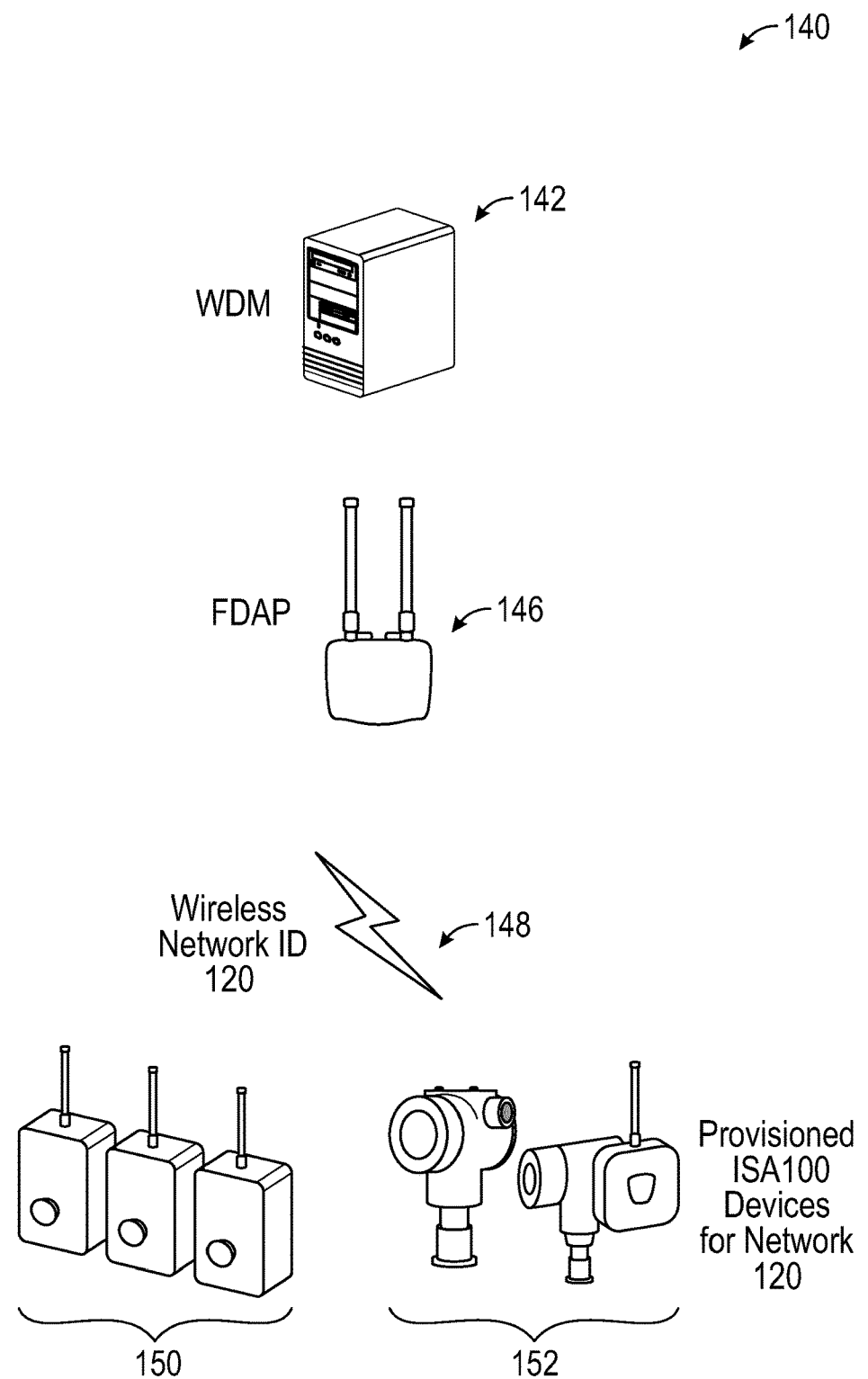
FIG. 6 illustrates a schematic diagram of a system for ISA100 OTAP, in accordance with an example embodiment.

FIG. 6 illustrates a schematic diagram of a system 140 for ISA100 OTAP, in accordance with an example embodiment. System 140 includes a WDM 142 that communicates with one or more FDAP's such as the FDAP 146 which in turn communicates via wireless communications 148 (wireless network ID 120) with devices 150 and provisioned ISA 100 devices 162 for network 120. The basic features for ISA 100 OTAP as shown in FIG. 6 involve first, accepting and provisioning the new ISA 100 devices 152 from a user interface, and second, joining the new devices to the network ID 120 after provisioning. Third, OTAP in the the gateway is disabled, followed by, four, no new tools required for provisioning the ISA100 devices.

Figure 7:
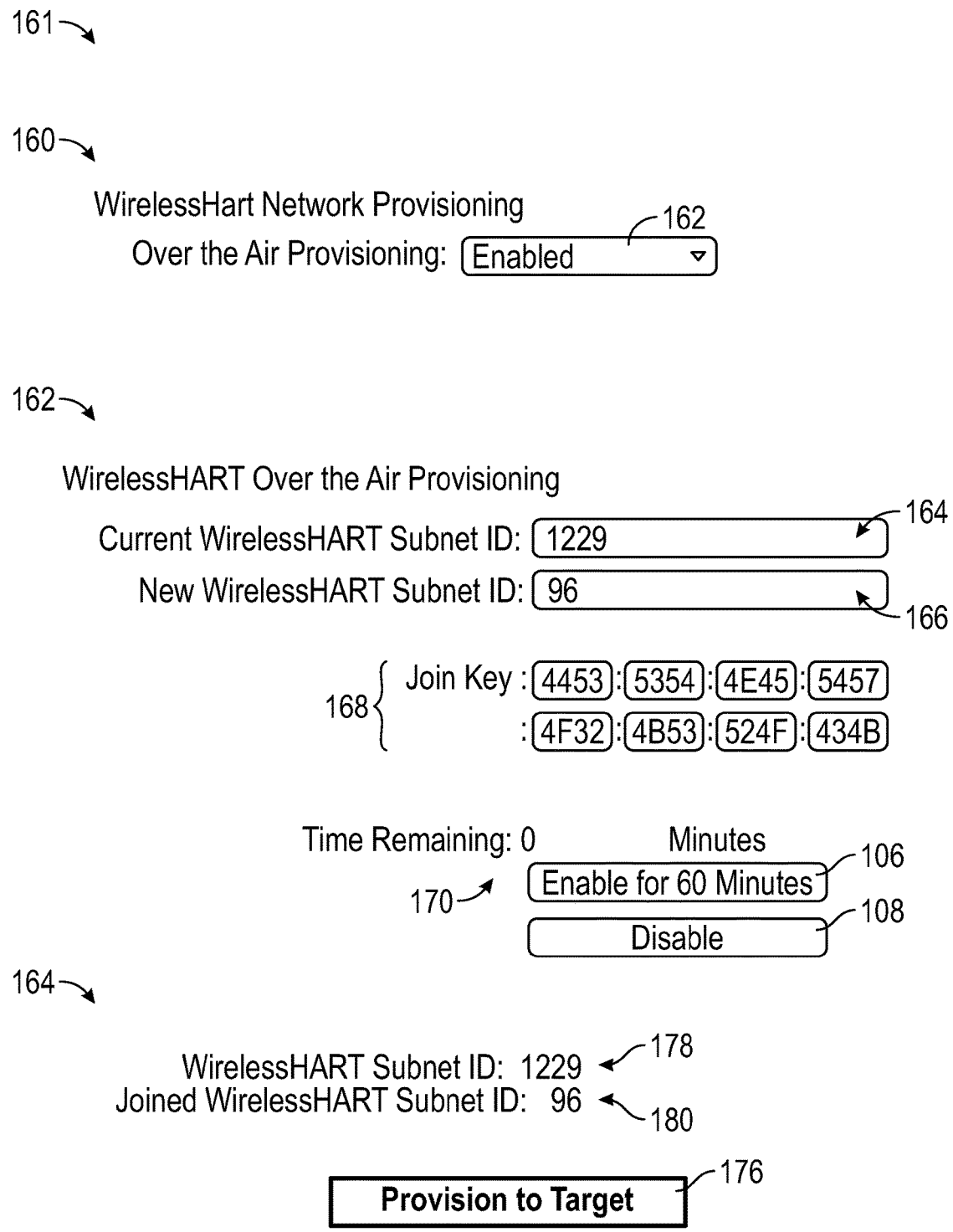
FIG. 7 illustrates a portion of a GUI (Graphical User Interface) including a graphically displayed selection buttons for OTAP for wirelessHART devices, in accordance with an example embodiment.

FIG. 7 illustrates a portion of a GUI (Graphical User Interface) 161 including graphically displayed selection buttons for OTAP for wirelessHART devices, in accordance with an example embodiment. The GUI 160 is provided as a system/gateway level setting. The GUI 161 includes a GUI section 160 for WirelessHART network provisioning and enablement of OTAP via a graphically displayed selection button 142. The GUI 161 further includes a section 162 for WirelessHART OTAP that includes an area 164 for displaying the current WirelessHART Subnet ID (e.g., shown as 1229 in FIG. 7).

The GUI further includes an area 166 for entering and displaying the new WirelessHART Subnet ID (e.g., shown as 96) with which the new WirelessHART devices are shipped from factory and they have to be provisioned to target WirelessHART subnet id (Shown as 1229 in FIG. 7).

In addition, a Join Key 168 is displayed along with the time remaining (e.g., shown as 0 minutes) 170 and a button 170 for enabling for a particular amount of time (e.g., 60 minutes) and a button 174 for disabling OTAP. The join key entered here is the join key of the new WirelessHART devices shipped from factory and they have to be provisioned to target WirelessHART subnet. The GUI 162 is provided as a configurable setting for each WirelessHART Access Point. The GUI 102 is independent for each Access Point enabling and disabling of OTAP for each Access Point and can be executed by a user based on the placement of new WirelessHART devices installed in the plant. The Access Point closer to the newly placed devices is enabled for WirelessHART OTAP.

Finally the GUI 161 can include a section 164 that includes an area 178 that displays the target WirelessHART Subnet ID and an area 180 that displays the new WirelessHART device Joined WirelessHART Subnet ID. Multiple new WirelessHART devices received from different device vendors installed in different locations of the plant, (e.g., Vendor 1. Devices received from factory with Subnet ID XX and Join Key 1 and Vendor B devices received from factory with Subnet ID YY and Join Key 2), using two different FDAP's, enable OTAP in FDAP1 with new WirelessHART subnet ID (GUI 166) XX and Join Key 1 (GUI 169), enable OTAP in FDAP2 with new WirelessHART subnet ID YY and Join Key 2, both the new vendor 1 and 2 devices can be provisioned at the same time, A graphically displayed selection button 176 can also initiate of "Provision to Target" with respect to a target WirlessHART network ID. The GUI 164 is provided for every WirelessHART device once it is joined the network. If new WirelessHART network Id is not same as the target/current WirelessHART network ID then the device needs to be provisioned to the target network id to operate it correctly on the network and send the process data to gateway.

Thus, the following features are provided by the methodology disclosed herein:

1. A new system level setting is provided to enable OTAP for WirelessHART Devices.

2. Each FDAP can be enabled/disabled to advertise in a specific WirelessHART Network Id along with target WirelessHART Network ID.

3. A join key is also provided along with a new WirelessHART network id to which the FDAP needs to be advertised (a time limit can be provided along with it).

4. A new method of provisioning will enable provisioning of the device to the target network, and the WDM will write the Target Network ID and a new Join Key to the new WirelessHART device and restart the device (or devices).

5. Once provisioning is completed, the WirelessHART OTAP network can be disabled.

Figure 8:
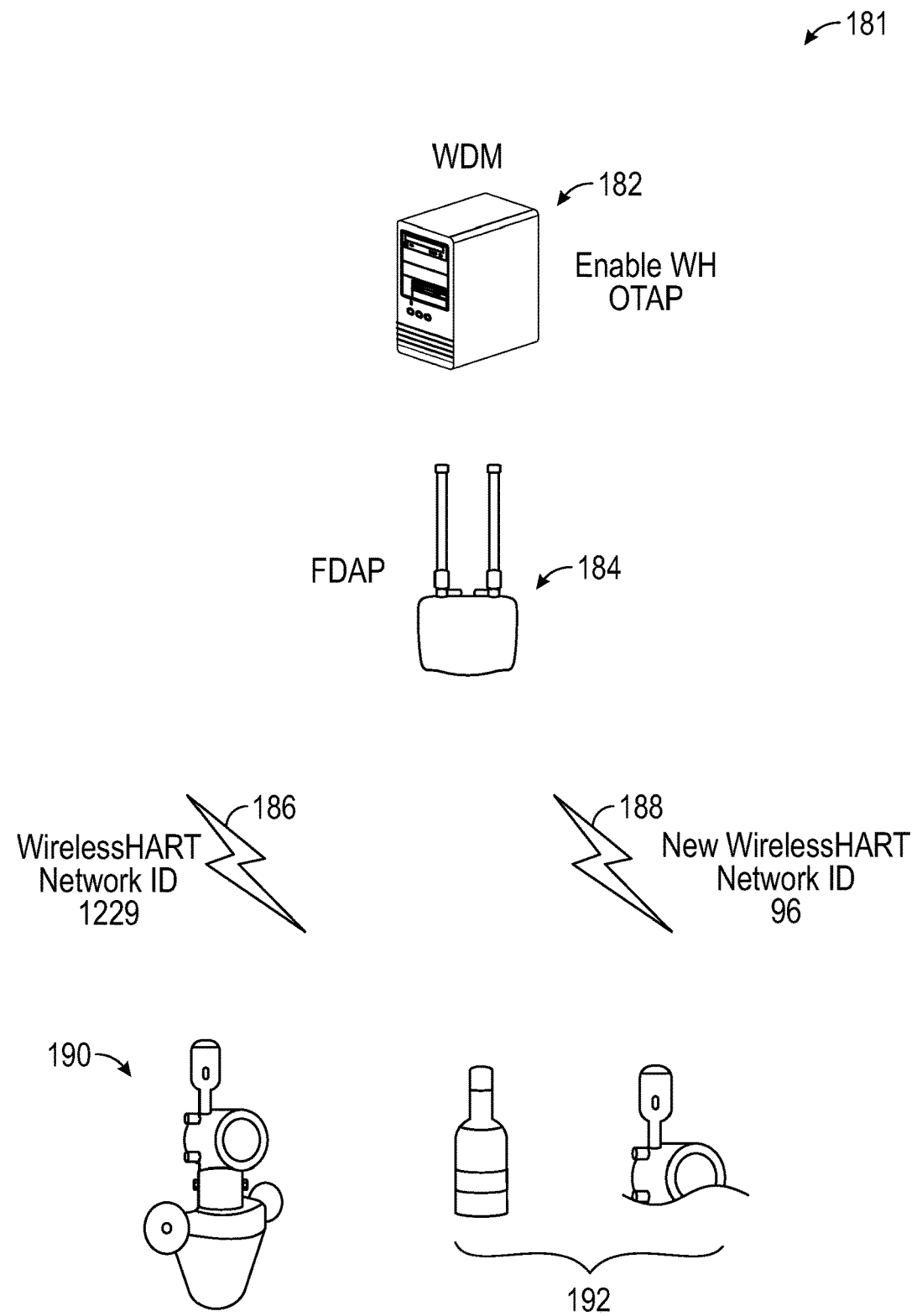
FIG. 8 illustrates a schematic diagram of a system for OTAP of wirelessHART devices, in accordance with another example embodiment.

FIG. 8 illustrates a schematic diagram of a system 181 for OTAP of wirelessHART devices, in accordance with another example embodiment. The system 181 generally includes a WDM 182 that enables WH OTAP and which communicates with one or more FDAP's such as the FDAP 184 shown in FIG. 8. The FDAP 184 communicates via wireless communications 186 (e.g., WirelessHART Network ID 1229) with a field device 190 and also communicates via wireless communications 188 (e.g, new WirelessHART Network ID 96) with devices 192. The following methodology can thus be implemented:

1. Check the new WirelessHART device shipped Network ID and Join key.

2. Enter WirelessHART Network ID and Join key to which the OTAP needs to be enabled in an FDAP close to the place where new device is placed.

3. Enabled WirelessHART OTAP for a specific duration of time.

4. The new WirelessHART Device joins WDM and displays that it is joined to the Over the Air provisioning Network ID.

5. The user provisions the device to the Customer Network ID and the WDM (e.g., WDM 182) restarts the device.

6. The device joins to the target network on rejoin.

7. Disable WirelessHART OTAP.

Figure 9:
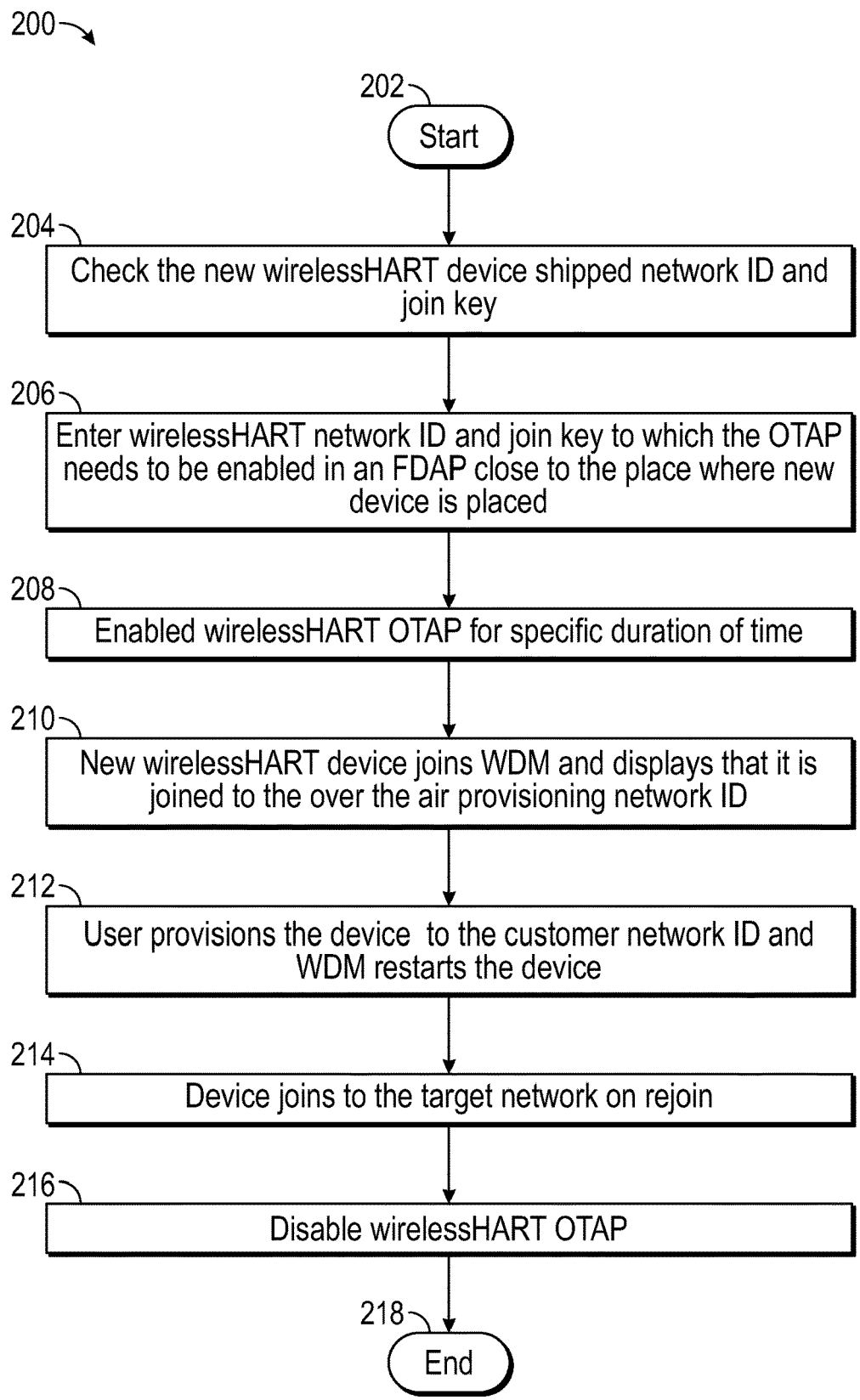
FIG. 9 illustrates a high-level flow chart of operations depicting logical operational steps of a method for OTAP for wirelessHART devices, in accordance with an example embodiment.

FIG. 9 illustrates a high-level flow chart of operations depicting logical operational steps of a method 200 for OTAP for wirelessHART devices, in accordance with an example embodiment. As shown at block 202, the process begins. As depicted next at block 204, a step or operation can be implemented to check the new WirelessHART device shipped Network ID and Join key. Next, as illustrated at block 206, a step or operation can be implemented to enter the WirelessHART Network ID and the Join key to which the OTAP needs to be enabled in an FDAP close to the place where new device is placed. Thereafter, as depicted at block 208, a step or operation can be implemented to enable WirelessHART OTAP for a specific duration of time. Then, as shown at block 210, the new WirelessHART Device joins the WDM and displays that it is joined to the Over the Air provisioning Network ID. Thereafter, as shown at block 212, the user provisions the device to the Customer Network ID and the WDM (e.g., WDM 182) restarts the device. Then, as indicated at block 214, the device joins to the target network on rejoin. Then, the WirelessHART OTAP can be disabled. The process can then end, as shown at block 218.

The disclosed method for OTAP for wirelessHART offers a number of advantages. First, any WirelessHART device can be provisioned into the network directly out of factory with out any specific tools. Second, there is no need to ask WirelessHART device vendors to load a specific network ID and join keys into their devices before shipping. Third, there is no need to have a separate system (e.g., such as SKF vibration devices) to provision them to a customer network. Fourth, this approach offers a consistency of solution for both ISA100 and WirelessHART in the case of configurations that support multi protocol solutions. Fifth, this is the first system and method to offer OTAP for WirelessHART devices, and today there are currently no vendor systems that support this effort.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on a user's, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
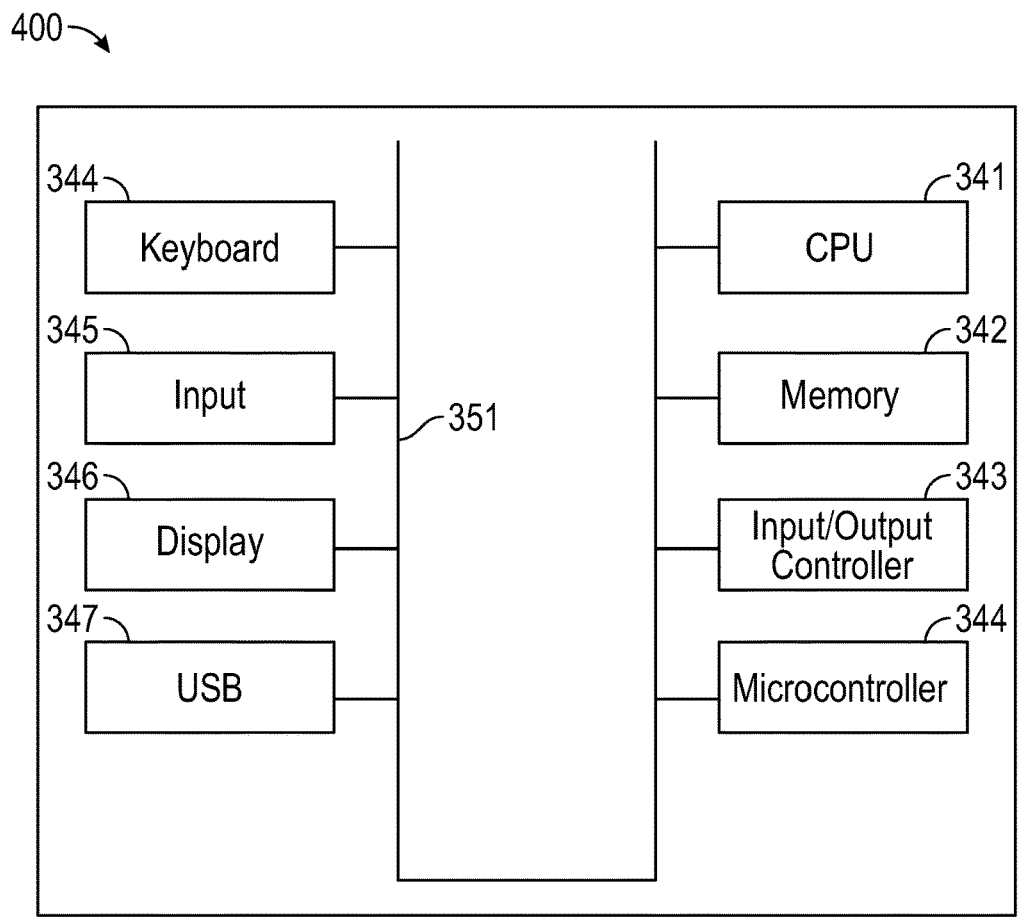
FIG. 10 illustrates a schematic view of a computer system/apparatus, which can be implemented in accordance with an example embodiment.
Figure 11:
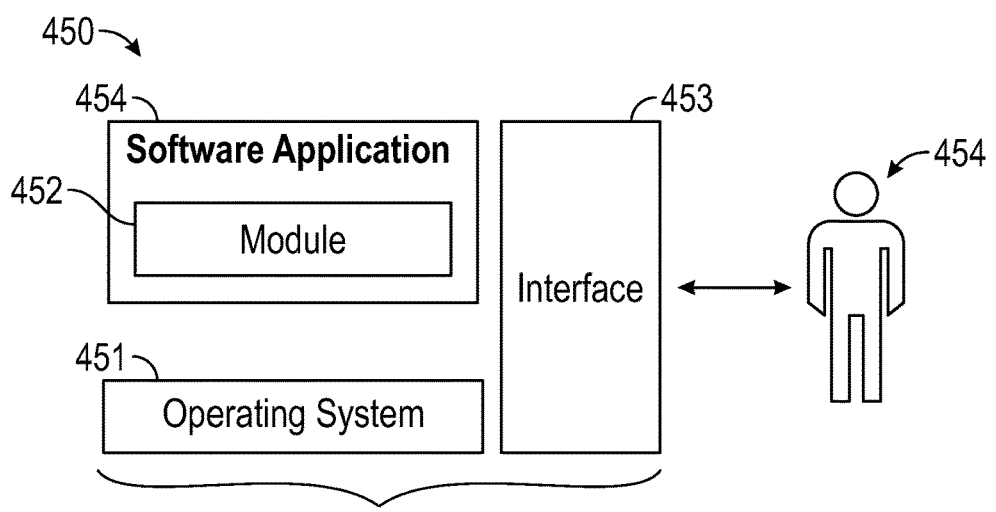
FIG. 11 illustrates a schematic view of a software system including a module, an operating system, and a user interface, which can also be implemented in accordance with an example embodiment.

FIGS. 10-11 are shown only as exemplary diagrams of data-processing environments in which example embodiments may be implemented. It should be appreciated that FIGS. 10-11 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 10, some example embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server). The data-processing system/apparatus 400 may be implemented in some embodiments as, for example, a server and/or a personal computer, a mobile device (e.g., smartphone, tablet computing device, laptop computer, etc), and/or other computing devices or systems, etc. Thus, the data-processing system/apparatus 400 may be implemented in some example embodiments as computers or computing devices such as the one or more stationary workstations 16, the one or more portable workstations 18, the standalone host 47 and or the computer 41 discussed previously herein with respect to FIG. 1.

In other example embodiments, data-processing system/apparatus 400 may be, for example, a standalone desktop computer, a laptop computer, a smartphone, a pad computing device and so on, wherein each such device is operably connected to and/or in communication with a client-server based network or other types of networks (e.g., cellular networks, Wi-Fi, etc.).

FIG. 11 illustrates a computer software system/apparatus 450 for directing the operation of the data-processing system/apparatus 400 depicted in FIG. 10. Software application 454, stored for example in memory 342, generally includes a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 453; these inputs may then be acted upon by the data-processing system/apparatus 400 in accordance with instructions from operating system 451 and/or software application 454. The interface 453 in some embodiments can serve to display results, whereupon a user 459 may supply additional inputs or terminate a session. The interface 453 may be a GUI such as discussed herein.

The software application 454 can include module(s) 452, which can, for example, implement the various instructions or operations such as those discussed herein with respect to FIG. 9 and elsewhere herein. Module 452 may also be composed of a group of modules or sub-modules that implement particular instructions, steps, or operations, such as discussed and illustrated herein with respect to FIG. 9 and elsewhere herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 10-11 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. For example, some embodiments may be implemented in the context of a special-purpose computer instead of a general-purpose computer or vice versa.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The disclosed embodiments offer a number of benefits. For example, a hot-redundant MST system is capable of overtaking failures, and handling unplanned maintenances. This approach can also ensure fail-safe circumstances in liquid hydrocarbon product O&M (Operations and Maintenance), and secure process uptime. In addition, the disclosed approach will result in no shutdowns or process breakdowns. The disclosed redundant probe can also reduce the downtime for future breakdown/unplanned/scheduled maintenance. Existing and new customers will also find the disclosed dual option in a single installation attractive due to minimal maintenance expenditure and accuracy, accurate process measurement, and the fact that human interference and corresponding errors will be considerably reduced.

Based on the foregoing, it can be appreciated that a number of example embodiments are disclosed herein. For example, in one embodiment a method for over the air provisioning of WirelessHART (Highway Addressable Remote Transducer) devices can be implemented. Such an example method can includes steps, instructions or operations such as: providing a system level setting for enabling OTAP (Over the Air Provisioning) of WirelessHART devices in a WirelessHART network having a plurality of field device access points; configuring each of the field device access points among the plurality of field device access points to be enabled or disabled to advertise in a specific WirelessHART network ID in association with a target WirelessHART network ID with respect to the WirelessHART network; and providing a join key in association with a new WirelessHART network ID to which at least one field device access point among the plurality of field device access points needs to be advertised along with a time limit, thereby enabling provisioning of the WirelessHART devices to a target wireless network, wherein the target WirelessHART network ID and the join key are written with respect to a new WirelessHART device and the new WirelessHART device is then restarted.

In another example embodiment, a step or operation can be implemented for disabling the WirelessHART network after the aforementioned provisioning is complete. In some example embodiments, a WDM (Wireless Device Manager) can write the WirelessHART network ID and the Join key with respect to the new Wireless HART device and then restarts the new WirelessHART device. In yet another example embodiment, the WDM communicates with the at least one field device access point. In still another example embodiment, a step or operation can be provided for provisioning the new WirelessHART device through a GUI (Graphical User Interface). In some example embodiments, the aforementioned GUI can be provided as a system/gateway level setting.

In another example embodiment, the aforementioned GUI can include a GUI section for WirelessHART network provisioning and enablement of the OTAP via a graphically displayed selection button; and wherein the GUI includes a graphically displayed section for the OTAP that includes an area for displaying a current WirelessHART Subnet ID. In still another example embodiment, the GUI can include a graphically displayed interactive area for entering and displaying a new WirelessHART Subnet ID with which new WirelessHART devices are shipped from a factory and require provisioning to target a WirelessHART subnet ID and wherein the GUI additionally graphically displays the join key in association with a time remaining and a graphically display button for enabling for a particular amount of time and a graphically displayed button for disabling the OTAP.

In another example embodiment, a system for over the air provisioning of WirelessHART devices, can be provided. Such a system can include, for example, a storage device, wherein the storage device stores computer usable program code; and a processor, wherein the processor executes the computer usable program code. Such computer usable program code can include instructions for providing a system level setting for enabling OTAP (Over the Air Provisioning) of WirelessHART devices in a WirelessHART network having a plurality of field device access points; configuring each of the field device access points among the plurality of field device access points to be enabled or disabled to advertise in a specific WirelessHART network ID in association with a target WirelessHART network ID with respect to the WirelessHART network; and providing a join key in association with a new WirelessHART network ID to which at least one field device access point among the plurality of field device access points needs to be advertised along with a time limit, thereby enabling provisioning of the WirelessHART devices to a target wireless network, wherein the target WirelessHART network ID and the join key are written with respect to a new WirelessHART device and the new WirelessHART device is then restarted.

In yet another example embodiment, a wireless network can be implemented, which includes: a WirelessHART network having a plurality of field device access points, wherein a system level setting is provided for enabling OTAP (Over the Air Provisioning) of WirelessHART devices in the WirelessHART network having the plurality of field device access points; wherein each of the field device access points among the plurality of field device access points is configured to be enabled or disabled to advertise in a specific WirelessHART network ID in association with a target WirelessHART network ID with respect to the WirelessHART network; and wherein a join key is provided in association with a new WirelessHART network ID to which at least one field device access point among the plurality of field device access points needs to be advertised along with a time limit, thereby enabling provisioning of the WirelessHART devices to a target wireless network, wherein the target WirelessHART network ID and the join key are written with respect to a new WirelessHART device and the new WirelessHART device is then restarted.

The preceding description of the disclosed embodiments is provided to enable any person skilled in the art to make or use such embodiments. Various modifications to these embodiments will be readily apparent to those skilled in the art, and the generic principles defined herein may be applied to other embodiments without departing from the spirit or scope of the invention. Thus, the disclosed embodiments are not intended to be limited to the embodiments shown herein but are to be accorded the widest scope consistent with the following claims and the principles and novel features disclosed herein.

The invention claimed is:

1. A method for over the air provisioning of WirelessHART (Highway Addressable Remote Transducer) devices, said method comprising:
providing a system level setting for enabling OTAP (Over the Air Provisioning) of said WirelessHART devices in a WirelessHART network having a plurality of field device access points;
configuring each of said field device access points among said plurality of field device access points to be enabled or disabled to advertise via a specific WirelessHART network;
providing a join key in association with a new WirelessHART network to which at least one field device access point among said plurality of field device access points needs to advertise along with a time limit, thereby enabling provisioning of said WirelessHART devices to a target wireless network, wherein a target WirelessHART network ID and said join key are transmitted to a new WirelessHART device and said new WirelessHART device is then restarted; and
provisioning said new WirelessHART device through a GUI (Graphical User Interface), wherein said GUI includes a GUI section for WirelessHART network provisioning and enablement of said OTAP via a graphically displayed selection button; and wherein said GUI includes a graphically displayed section for said OTAP that includes an area for displaying a current WirelessHART Subnet ID.

2. The method of claim 1, further comprising disabling said WirelessHART network after said provisioning is complete.

3. The method of claim 1, wherein a WDM (Wireless Device Manager) transmits said target WirelessHART network ID and said join key to said new WirelessHART device and then restarts said new WirelessHART device.

4. The method of claim 3, wherein said WDM communicates with at least one of said plurality of field device access points.

5. The method of claim 1, wherein said GUI is provided as a system/gateway level setting.

6. The method of claim 1, wherein said GUI includes a graphically displayed interactive area for entering and displaying a new WirelessHART Subnet ID with which new WirelessHART devices are shipped from a factory and require provisioning to a target WirelessHART subnet ID and wherein said GUI additionally graphically displays said join key in association with a time remaining, a graphically displayed button for enabling said OTAP for a particular amount of time, and a graphically displayed button for disabling said OTAP.

7. A system for over the air provisioning of WirelessHART devices, said system comprising:
a storage device, wherein the storage device stores computer usable program code; and
a processor, wherein the processor executes the computer usable program code, and wherein the computer usable program code comprises instructions for:
providing a system level setting for enabling OTAP (Over the Air Provisioning) of said WirelessHART devices in a WirelessHART network having a plurality of field device access points;
configuring each of said field device access points among said plurality of field device access points to be enabled or disabled to advertise via a specific WirelessHART network;
providing a join key in association with a new WirelessHART network to which at least one field device access point among said plurality of field device access points needs to advertise along with a time limit, thereby enabling provisioning of said WirelessHART devices to a target wireless network, wherein a target WirelessHART network ID and said join key are transmitted to a new WirelessHART device and said new WirelessHART device is then restarted; and
provisioning said new WirelessHART device through a GUI (Graphical User Interface), wherein said GUI includes a GUI section for WirelessHART network provisioning and enablement of said OTAP via a graphically displayed selection button; and wherein said GUI includes a graphically displayed section for said OTAP that includes an area for displaying a current WirelessHART Subnet ID.

8. The system of claim 7, wherein said WirelessHART network is disabled after said provisioning is complete.

9. The system of claim 7, wherein a WDM (Wireless Device Manager) transmits said target WirelessHART network ID and said join key to said new WirelessHART device and then restarts said new WirelessHART device.

10. The system of claim 9, wherein said WDM communicates with at least one of said plurality of field device access points.

11. The system of claim 7, wherein said GUI is provided as a system/gateway level setting.

12. The system of claim 11, wherein said GUI includes a graphically displayed interactive area for entering and displaying a new WirelessHART Subnet ID with which new WirelessHART devices are shipped from a factory and require provisioning to a target WirelessHART subnet ID and wherein said GUI additionally graphically displays said join key in association with a time remaining, a graphically displayed button for enabling said OTAP for a particular amount of time, and a graphically displayed button for disabling said OTAP.

13. A wireless network, comprising:
a WirelessHART network having a plurality of field device access points, wherein a system level setting is provided for enabling OTAP (Over the Air Provisioning) of WirelessHART devices in said WirelessHART network having said plurality of field device access points;
wherein each of said field device access points among said plurality of field device access points is configured to be enabled or disabled to advertise via a specific WirelessHART network;
wherein a join key is provided in association with a new WirelessHART network to which at least one field device access point among said plurality of field device access points needs to advertise along with a time limit, thereby enabling provisioning of said WirelessHART devices to a target wireless network, wherein a target WirelessHART network ID and said join key are transmitted to a new WirelessHART device and said new WirelessHART device is then restarted; and
wherein said new WirelessHART device is provisioned through a GUI (Graphical User Interface), said GUI including a GUI section for WirelessHART network provisioning and enablement of said OTAP via a graphically displayed selection button; and wherein said GUI includes a graphically displayed section for said OTAP that includes an area for displaying a current WirelessHART Subnet ID.

14. The wireless network of claim 13, further comprising disabling said WirelessHART network after said provisioning is complete.

15. The wireless network of claim 13, wherein a WDM (Wireless Device Manager) transmits said target WirelessHART network ID and said join key to said new WirelessHART device and then restarts said new WirelessHART device.

16. The wireless network of claim 15, wherein said WDM communicates with at least one of said plurality of field device access points.

\* \* \* \* \*